(12) United States Patent
Murakami et al.

(10) Patent No.: US 8,384,367 B2
(45) Date of Patent: Feb. 26, 2013

(54) STEP-DOWN SWITCHING REGULATOR

(75) Inventors: Maki Murakami, Kyoto (JP); Takuya Ishii, Osaka (JP); Takashi Ryu, Kyoto (JP)

(73) Assignee: Panasonic Corporation, Osaka (JP)

( * ) Notice: Subject to any disclaimer, the term of this patent is extended or adjusted under 35 U.S.C. 154(b) by 705 days.

(21) Appl. No.: 12/567,149

(22) Filed: Sep. 25, 2009

(65) Prior Publication Data
US 2010/0134078 A1    Jun. 3, 2010

(30) Foreign Application Priority Data

Dec. 3, 2008 (JP) ................................. 2008-309120

(51) Int. Cl.
*G05F 1/40* (2006.01)
(52) U.S. Cl. ....................................... 323/285; 323/225
(58) Field of Classification Search .................. 323/222, 323/225, 282–285, 351
See application file for complete search history.

(56) References Cited

U.S. PATENT DOCUMENTS

| 5,161,097 | A | 11/1992 | Ikeda |
| 6,037,755 | A * | 3/2000 | Mao et al. ..................... 323/222 |
| 6,472,854 | B2 | 10/2002 | Ootani |
| 7,274,116 | B2 * | 9/2007 | Inoue et al. ................... 307/100 |
| 2004/0067740 | A1 | 4/2004 | Handa et al. |
| 2006/0006850 | A1 | 1/2006 | Inoue et al. |
| 2007/0241725 | A1 | 10/2007 | Ryu et al. |

FOREIGN PATENT DOCUMENTS

| JP | 60-257766 A | 12/1985 |
| JP | 05-260728 A | 10/1993 |
| JP | 06-351233 A | 12/1994 |
| JP | 2001-298945 A | 10/2001 |
| JP | 2002-064974 A | 2/2002 |
| JP | 2004-248374 A | 9/2004 |

* cited by examiner

*Primary Examiner* — Jessica Han
(74) *Attorney, Agent, or Firm* — McDermott Will & Emery LLP

(57) ABSTRACT

A step-down switching regulator includes a switching device coupled to an input terminal to which an input voltage is applied, an inductor having a first end and a second end, the first end being connected to the switching device, a smoothing unit having an output terminal and configured to smooth a voltage at the second end of the inductor and generate an output voltage at the output terminal, a rectifier configured to flow a current to the inductor when the switching device is in an OFF state, and a control circuit configured to drive the switching device so that the output voltage becomes equal to a set target voltage. The control circuit detects a difference voltage between the input voltage and the output voltage or a difference voltage between the input voltage and the set target voltage, and causes the switching device to be in an ON state when the difference voltage is lower than or equal to a predetermined voltage value.

4 Claims, 7 Drawing Sheets

STEP-DOWN SWITCHING REGULATOR

CROSS REFERENCE TO RELATED APPLICATION

This application claims priority to Japanese Patent Application No. 2008-309120 filed on Dec. 3, 2008, the disclosure of which including the specification, the drawings, and the claims is hereby incorporated by reference in its entirety.

BACKGROUND

The present disclosure relates to a step-down switching regulator which supplies a power source voltage to various electronic apparatuses.

The step-down switching regulator is used in, for example, a mobile electronic apparatus to step down an input battery voltage to a predetermined voltage and supply the predetermined voltage to an electronic circuit.

Referring to FIG. 9, such a step-down switching regulator includes an input terminal 1a through which an input voltage Vi is applied from an input power source 1, such as a battery or the like, a switching device 2 and a rectifier switching device 3 which are connected in series between the input terminal 1a and a common potential and are alternately switched ON and OFF, an inductor 4 having one end connected to a connection point between the switching device 2 and the rectifier switching device 3, an output capacitor 5 which smoothes a voltage at the other end of the inductor 4 to generate an output voltage Vo at an output terminal 1b, and a control circuit 60 which detects the output voltage Vo and drives the switching device 2 and the rectifier switching device 3 so that the output voltage Vo becomes equal to a set target voltage.

In the aforementioned configuration, when the switching device 2 is ON and the rectifier switching device 3 is OFF, a current flows from the input terminal 1a via the switching device 2 and the inductor 4 to the output terminal 1b. In this case, a difference voltage between the input voltage Vi and the output voltage Vo is applied to the inductor 4, which is therefore energized. Next, when the switching device 2 is OFF and the rectifier switching device 3 is ON, a current flows via the rectifier switching device 3 and the inductor 4 to the output terminal 1b. In this case, the output voltage Vo is applied to the inductor 4, which is therefore de-energized. In a steady state, the amounts of energization and de-energization of the inductor 4 are balanced, i.e., the product of an applied voltage and a period of time is the same between during energization and during de-energization, and therefore, the following relationship is satisfied:

$$(Vi-Vo) \times Ton = Vo \times Toff \quad (1)$$

where Ton represents an ON time period of the switching device 2 and Toff represents an OFF time period of the switching device 2. According to Expression (1), the output voltage Vo is represented by:

$$Vo = Vi \times Ton/(Ton+Toff) \quad (2)$$

The output voltage Vo is adjusted by the proportion (D=Ton/T, referred to as a duty ratio D) of the ON time period in a cycle T (=Ton+Toff) of the switching device 2.

As can be seen from Expression (2), if the input voltage Vi decreases as the battery (i.e., the input power source 1) is consumed, the duty ratio D of the switching device 2 increases so as to stabilize the output voltage Vo. For example, if duty ratio D is close to 1 (e.g., D=0.98), the OFF time period of the switching device 2 is excessively short, so that the circuit actually has difficulty in performing stable operation. Specifically, the switching device 2 repeats irregular switching between the ON state (D=1) and the switching operation, resulting in variations in the output voltage Vo.

As a technique for solving this problem, for example, Japanese Unexamined Patent Application Publication No. S60-257766 discloses a step-down switching regulator which switches the switching device 2 from switching regulator operation to series regulator operation when the input voltage Vi decreases to less than a predetermined value.

Also, U.S. Pat. No. 6,472,854 discloses a step-down switching regulator, as shown in FIG. 10, which includes a bypass transistor 7 between an input and an output thereof, and activates the bypass transistor 7 when detecting that the duty ratio D of the switching device 2 is 1.

In FIG. 10, a drive circuit 22 which drives the bypass transistor 7 includes an N-channel FET 221, a resistor 222, a capacitor 223, and a diode 224. The capacitor 223 is charged via the resistor 222 when the switching device 2 is ON, and is discharged via the diode 224 and the rectifier switching device 3 when the switching device 2 is switched OFF and the rectifier switching device 3 is switched ON. The charging time constant of the capacitor 223 is set so that the N-channel FET 221 is not switched ON during normal switching operation of the switching device 2. Therefore, the bypass transistor 7 is maintained in the OFF state.

When the input voltage Vi decreases close to the output voltage Vo and the duty ratio D of the switching device 2 reaches 1, the capacitor 223 is no longer discharged, and therefore, the gate voltage of the N-channel FET 221 is pulled up by the resistor 222, so that the N-channel FET 221 is caused to be in the ON state. As a result, the bypass transistor 7 is also caused to be in the ON state, and therefore, operation where the duty ratio D=1 is established, and in addition, the ON resistance of the bypass transistor 7 is connected in parallel to a serial resistance of the ON-resistance of the switching device 2 and the inductor 4, so that a capability to supply a current to the output terminal 1b is improved.

SUMMARY

In the method in which switching regulator operation is switched to series regulator operation as disclosed in Japanese Unexamined Patent Application Publication No. S60-257766, it is necessary to compensate for a phase of a feedback system, depending on a conversion characteristic which differs between the switching regulator and the series regulator, which is problematically difficult to design. Moreover, when the switching is performed, depending on the detection of the input voltage Vi, the threshold needs to be set to a voltage which is slightly higher than the output voltage Vo, the step-down switching regulator cannot work well when the set target output voltage is changed, depending on the situation of an electronic circuit which is a load.

In U.S. Pat. No. 6,472,854, the duty ratio D=1 is detected, and therefore, the step-down switching regulator can work well even when the set target voltage of the output is changed. However, a circuit for detecting the duty ratio D=1 is required. In addition, this technique is not applicable to a step-down switching regulator which has a minimum OFF time period during which the duty ratio D does not reach the maximum of 1, which is a problem.

An object of the present disclosure is to provide a step-down switching regulator in which, when the duty ratio is close to 1 during switching operation, the duty ratio can be caused to be 1 irrespective of the presence or absence of the minimum OFF time period during the switching operation and variations in the set target output voltage.

To achieve the object, a step-down switching regulator according to an embodiment of the present disclosure has a control circuit which detects a difference voltage between an input voltage and an output voltage or a difference voltage between the input voltage and a set target output voltage, and causes a switching device to be in the ON state when the difference voltage is lower than or equal to a predetermined voltage value. With this configuration, when a duty ratio is close to 1 during switching operation, the duty ratio can be caused to be 1 irrespective of the presence or absence of a minimum OFF time period during the switching operation and variations in the set target output voltage, resulting in stable operation.

A step-down switching regulator according to another embodiment of the present disclosure includes a first control circuit which drives a switching device, a bypass transistor coupled between an input terminal and an output terminal, and a second control circuit which drives the bypass transistor. The second control circuit detects a difference voltage between an input voltage and an output voltage or a difference voltage between the input voltage and a set target output voltage, and causes the bypass transistor to be in the ON state when the difference voltage is lower than or equal to a predetermined voltage value. With this configuration, when a duty ratio is close to 1 during switching operation, the input and the output are short-circuited via the bypass transistor, and therefore, the duty ratio can be caused to be 1.

The second control circuit also causes the switching device to be in the ON state when the difference voltage is lower than or equal to a predetermined voltage value, thereby reducing an input-output impedance and improving the efficiency, resulting in the enhancement of a capability of supplying a current to the output terminal.

When a rectifier is a synchronous rectifier including a rectifier switching device, the rectifier switching device may be caused to be in the OFF state when the difference voltage is lower than or equal to a predetermined voltage value.

The second control circuit also detects a current flowing through the inductor and drives the bypass transistor so that a current flowing through the inductor does not exceed a predetermined current value. As a result, it is possible to add an effect that the step-down switching regulator can output a current which is larger than or equal to a maximum current which causes the inductor to reach magnetic saturation.

The second control circuit also detects the output voltage, and causes the bypass transistor to be in the OFF state when the output voltage is lower than or equal to a predetermined voltage value. With this configuration, it is possible to add an effect of protecting the bypass transistor from a ground fault.

DETAILED DESCRIPTION

Hereinafter, step-down switching regulators according to embodiments of the present disclosure will be described with reference to the accompanying drawings.

(First Embodiment)

Figure 1:
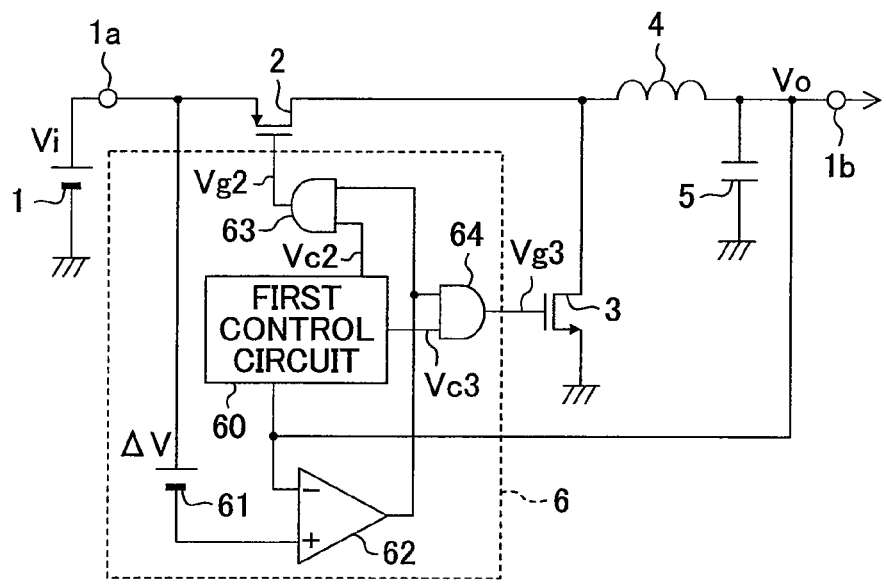
FIG. 1 is a diagram showing a circuit configuration of a step-down switching regulator according to a first embodiment of the present disclosure.

FIG. 1 is a diagram showing a circuit configuration of a step-down switching regulator according to a first embodiment of the present disclosure. In FIG. 1, reference symbol 1 indicates an input power source, such as a battery or the like, which generates an input voltage Vi. Reference symbol 1a indicates an input terminal through which the input voltage Vi is applied, and reference symbol 2 indicates a switching device coupled to the input power source 1, which includes a P-channel FET. Reference symbol 3 indicates a rectifier switching device which is a rectifier and includes an N-channel FET. The switching device 2 and the rectifier switching device 3 are alternately switched ON and OFF. Reference symbol 4 indicates an inductor having one end connected to an output of the switching device 2. Reference symbol 5 indicates an output capacitor which is a smoothing unit and is connected to the other end of the inductor 4, and generates and outputs an output voltage Vo through an output terminal 1b. Reference symbol 6 indicates a control circuit which has a first control circuit 60 which detects the output voltage Vo and outputs signals Vc2 and Vc3 so that the output voltage Vo becomes equal to a set target voltage. The first control circuit 60 corresponds to the conventional control circuit 60 described in the BACKGROUND section. The signal Vc2 is a pulsed signal which has a cycle T and is at the L level during an ON time period Ton. The signals Vc2 and Vc3 have substantially the same phase, and have a minute phase difference called a dead time so as to prevent the switching device 2 and the rectifier switching device 3 from being simultaneously switched ON.

The control circuit 6 has a comparator 62 which compares a voltage (Vi−ΔV) which is obtained by subtracting an offset voltage ΔV of an offset voltage source 61 from the input voltage Vi, with the output voltage Vo, a first AND circuit 63 to which an output of the comparator 62 and the signal Vc2 are input, and a second AND circuit 64 to which the output of the comparator 62 and the signal Vc3 are input. An output of the first AND circuit 63 is a drive signal Vg2 which is input to the switching device 2, and an output of the second AND circuit 64 is a drive signal Vg3 which is input to the rectifier switching device 3.

Figure 2:
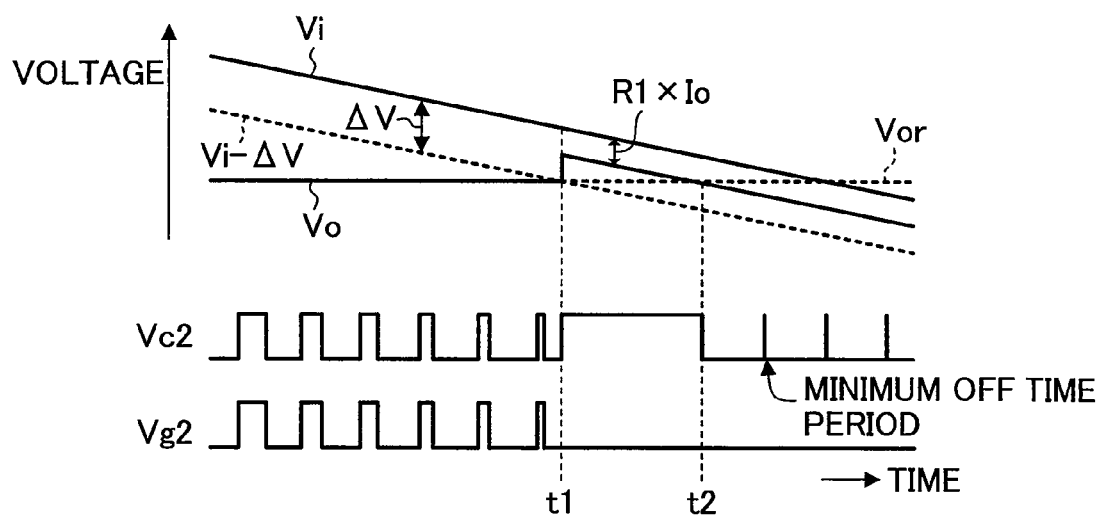
FIG. 2 is a diagram showing operating waveforms of the step-down switching regulator of FIG. 1.

FIG. 2 is a diagram showing waveforms at main parts of the step-down switching regulator of FIG. 1, indicating the input voltage Vi, the output voltage Vo, the signal Vc2 and the drive signal Vg2.

Hereinafter, operation of the step-down switching regulator of FIG. 1 will be described with reference to FIG. 2. Before time t1 of FIG. 2, the voltage (Vi−ΔV) which is obtained by subtracting the offset voltage ΔV from the input voltage Vi is higher than the output voltage Vo (i.e., Vi−Vo>ΔV), and therefore, the step-down switching regulator operates as a typical switching regulator. In this case, the output of the comparator 62 is at the H level, the drive signal Vg2 which is the output of the first AND circuit 63 is equal to the signal Vc2, and the drive signal Vg3 which is the output of the second AND circuit 64 is equal to the signal Vc3. Therefore, the switching device 2 and the rectifier switching device 3 are alternately switched ON and OFF so that the first control circuit 60 allows the output voltage Vo to become equal to a set target voltage Vor. In this case, if the drive signal Vg2 and the signal Vc2 are each at the L level, the switching device 2 is ON and the rectifier switching device 3 is OFF, and therefore, a difference voltage (Vi−Vo) between the input voltage Vi and the output voltage Vo is applied to the inductor 4, so that a current flows from the input terminal 1a via the switching device 2 and the inductor 4 to the output terminal 1b, and therefore, the inductor 4 is energized. On the other hand, when the drive signal Vg2 and the signal Vc2 are each at the H level, the switching device 2 is OFF and the rectifier switching device 3 is ON, and therefore, the output voltage Vo is applied to the inductor 4, so that a current flows via the rectifier switching device 3 and the inductor 4 to the output terminal 1b, and therefore, the inductor 4 is de-energized. In a steady state, the amounts of energization and de-energization of the inductor 4 are balanced, and therefore, the following relationship is satisfied, as is similar to the description in the BACKGROUND section:

$$Vo = Vi \times Ton/T = Vi \times D \quad (3)$$

The first control circuit 60 adjusts the duty ratio D so that the output voltage Vo becomes equal to the set target voltage Vor. If the input voltage Vi decreases as the battery (i.e., the input power source 1) is consumed, the duty ratio D of the switching device 2 is increased so that the output voltage Vo is maintained at a constant value as can be seen from Expression (3). In FIG. 2, pulse widths of the signal Vc2 and the drive signal Vg2 gradually become narrower.

Next, after time t1 of FIG. 2, operation is shown where the input voltage Vi decreases, so that the voltage (Vi−ΔV) which is obtained by subtracting the offset voltage ΔV from the input voltage Vi becomes lower than the output voltage Vo (i.e., Vi−Vo<ΔV). In this case, the output of the comparator 62 is at the L level, the drive signal Vg2 which is the output of the first AND circuit 63 is fixed to the L level, and the drive signal Vg3 which is the output of the second AND circuit 64 is also fixed to the L level. Therefore, the switching device 2 is maintained in the ON state, and the rectifier switching device 3 is maintained in the OFF state.

In this case, the output voltage Vo is represented by:

$$Vo = Vi - R1 \times Io \quad (4)$$

where R1 indicates the sum of resistance values of resistors coupled in series between the input and the output including series resistors, including the ON-resistance of the switching device 2, the inductor 4, and Io indicates a current output from the output terminal 1b. Since the offset voltage ΔV is set to ΔV>R1×Io, the output voltage Vo is higher than the set target voltage Vor immediately after time t1. Therefore, the first control circuit 60 causes each of the signals Vc2 and Vc3 to have a broader pulse width and be at the H level.

Further, if the input voltage Vi decreases, so that the output voltage Vo becomes lower than the set target voltage Vor at time t2, the first control circuit 60 minimizes the pulse widths of the signals Vc2 and Vc3. If the first control circuit 60 can adjust the duty ratio D up to D=1, the first control circuit 60 causes each of the signals Vc2 and Vc3 to be at the L level.

As described above, according to the step-down switching regulator of the present disclosure, even if the first control circuit 60 corresponding to a conventional control circuit has a minimum OFF time period, then when the input voltage Vi decreases, so that the voltage (Vi−ΔV) becomes lower than the output voltage Vo, i.e., the input-output voltage (Vi−Vo) becomes lower than the predetermined offset voltage ΔV, the switching device 2 is forced to be in the ON state. As a result, the duty ratio D is caused to be 1 irrespective of the presence or absence of the minimum OFF time period during switching operation and variations in the set target output voltage Vor, thereby obtaining stable operation.

(Second Embodiment)

Figure 3:
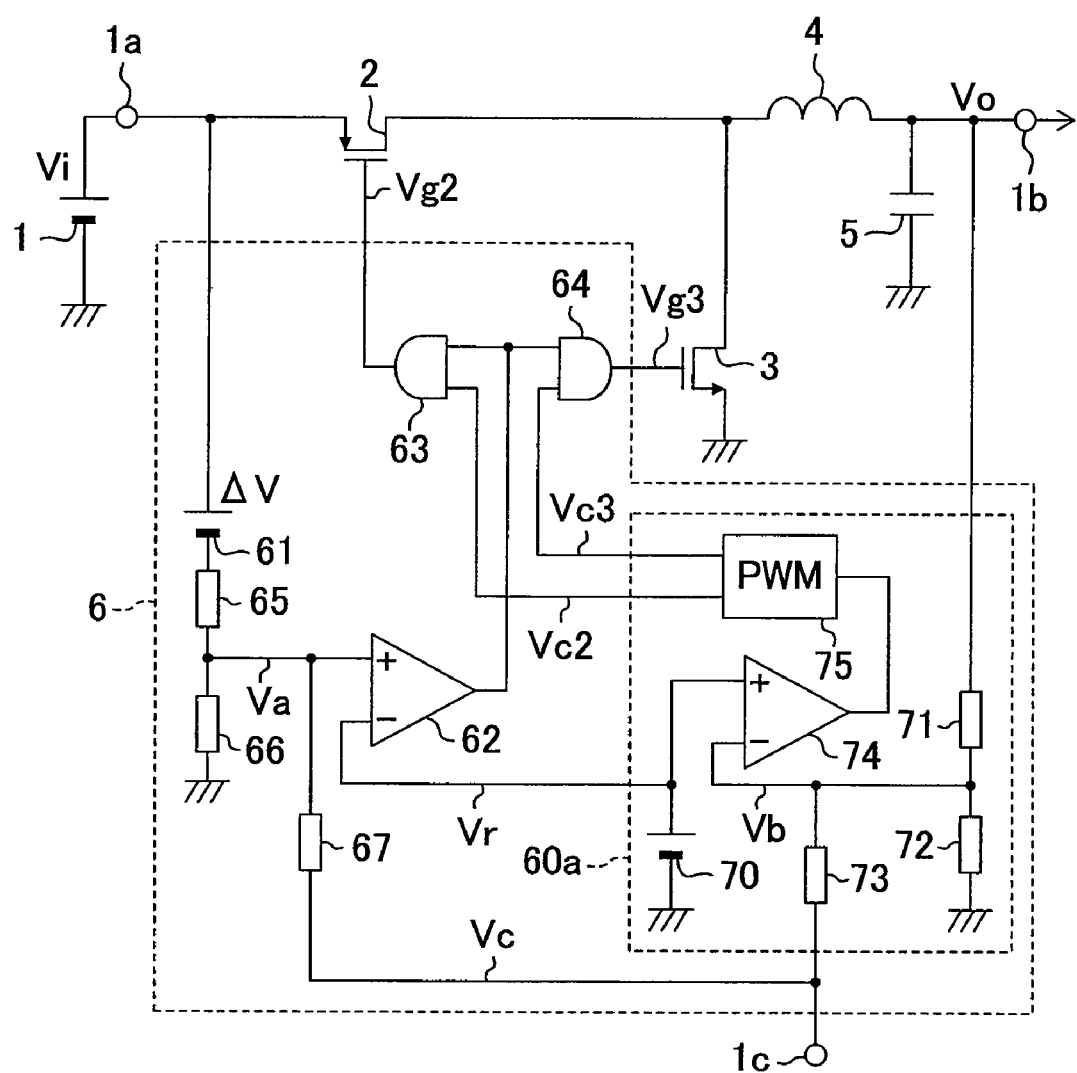
FIG. 3 is a diagram showing a circuit configuration of a step-down switching regulator according to a second embodiment of the present disclosure.

FIG. 3 is a diagram showing a circuit configuration of a step-down switching regulator according to a second embodiment of the present disclosure. In FIG. 3, the same parts as those of the step-down switching regulator of the first embodiment of the present disclosure shown in FIG. 1 are indicated by the same reference symbols and will not be described. The step-down switching regulator of FIG. 3 is different from that of FIG. 1 in a control terminal 1c to which a control voltage Vc is externally input so as to cause the output voltage Vo to be variable, the configuration of the control circuit 6, and a configuration which generates an input signal to the comparator 62.

A first control circuit 60a provided in the control circuit 6 includes a reference voltage source 70 which generates a reference voltage Vr, a resistor 71 and a resistor 72 which are division resistors for detecting the output voltage Vo, a resistor 73 one end of which is connected to the control terminal 1c and the other end of which is connected to a connection point of the resistors 71 and 72, an error amplifier 74 to which a potential Vb at the connection point of the resistors 71 and 72 and the reference voltage Vr are input, and a pulse width modulation (PWM) circuit 75 which outputs signals Vc2 and Vc3, depending on an output of the error amplifier 74.

A potential Va at a connection point of a resistor 65 and a resistor 66 connected between the input voltage Vi and a common potential via the offset voltage source 61, and the reference voltage Vr are input to the comparator 62. A resistor 67 is coupled between the connection point of the resistors 65 and 66 and the control terminal 1c. The resistor 65 has a resistance value Ra which is equal to that of the resistor 71. The resistor 66 has a resistance value Rb which is equal to that of the resistor 72. The resistor 67 has a resistance value Rc which is equal to that of the resistor 73.

Operation of the step-down switching regulator of the second embodiment of the present disclosure thus configured will be described.

Firstly, the voltage Va generated at the non-inverted input terminal of the comparator 62 is represented by:

$$Va = \{(Vi - \Delta V)/Ra + Vc/Rc\}/(1/Ra + 1/Rb + 1/Rc) \quad (5)$$

The comparator 62 compares the voltage Va with the reference voltage Vr.

When the input voltage Vi is high and therefore Va>Vr, the comparator 62 outputs a signal having the H level. Therefore, the first AND circuit 63 directly outputs the signal Vc2, and the second AND circuit 64 directly outputs the signal Vc3.

On the other hand, the voltage Vb generated at the inverted input terminal of the error amplifier 74 is represented by:

$$Vb = (Vo/Ra + Vc/Rc)/(1/Ra + 1/Rb + 1/Rc) \quad (6)$$

The error amplifier 74 outputs an error signal which is obtained by amplifying an error between the voltage Vb and the reference voltage Vr. The error signal is input to the PWM circuit 75. The PWM circuit 75 outputs the signals Vc2 and Vc3 whose pulse widths are adjusted so that the error between the voltage Vb and the reference voltage Vr becomes zero. Therefore, as described above, when the signals Vc2 and Vc3 are used as the drive signals Vg2 and Vg3 to cause the switching device 2 and the rectifier switching device 3 to perform switching operation, the output voltage Vo is controlled so that the voltage Vb and the reference voltage Vr become equal to each other. According to Expression (6), if it is assumed that Vb=Vr, the output voltage Vo is stabilized to:

$$Vor = (1 + Ra/Rb + Ra/Rc) \times Vr - Rc/Ra \times Vc \quad (7)$$

The output voltage Vo is also controlled so that it decreases as the control voltage Vc is increased. The voltage Vor represented by Expression (7) is a set target output voltage.

Next, if the input voltage Vi decreases, so that Va<Vr, the output of the comparator 62 is inverted to the L level, and therefore, the drive signals Vg2 and Vg3 are both maintained at the L level. Therefore, the switching device 2 is fixed to the ON state, and the rectifier switching device 3 is fixed to the OFF state. A threshold Vir for the input voltage at which this operation is switched is represented by:

$$Vir = (1 + Ra/Rb + Ra/Rc) \times Vr - Rc/Ra \times Vc + \Delta V = Vor + \Delta V \quad (8)$$

which is obtained from Expression (5), assuming that Va=Vr.

Specifically, if a difference voltage between the input voltage Vi and the set target output voltage Vor is higher than the offset voltage ΔV, normal switching operation is performed, and if the difference voltage is lower, the switching device 2 is maintained in the ON state and the rectifier switching device 3 is maintained in the OFF state.

Although the input voltage Vi is directly compared with the output voltage Vo via the offset voltage ΔV in the first embodiment, the input voltage Vi is compared with the set target output voltage Vor via the offset voltage ΔV in the second embodiment. In the second embodiment, similar operation is performed during the steady state, and a quicker response can be achieved, for example, when the control voltage Vc steeply decreases, so that the set target voltage Vor is set to be close to the input voltage Vi. Specifically, in the second embodiment, when the control voltage Vc decreases, so that the set target output voltage Vor is set to be close to the input voltage Vi, the switching device 2 is fixed to the ON state. Since the duty ratio D becomes D=1 at the switching device 2 earlier than the increase of the duty ratio D due to the first control circuit 60a, the output voltage Vo quickly increases toward the input voltage Vi.

As described above, according to the step-down switching regulator of the second embodiment of the present disclosure, the duty ratio can be caused to be 1 irrespective of the presence or absence of the minimum OFF time period and variations in the set target output voltage, so that stable operation is achieved (the effect of the first embodiment), and in addition, the response speed when the set target voltage is set to be close to an input voltage, is improved.

(Third Embodiment)

Figure 4:
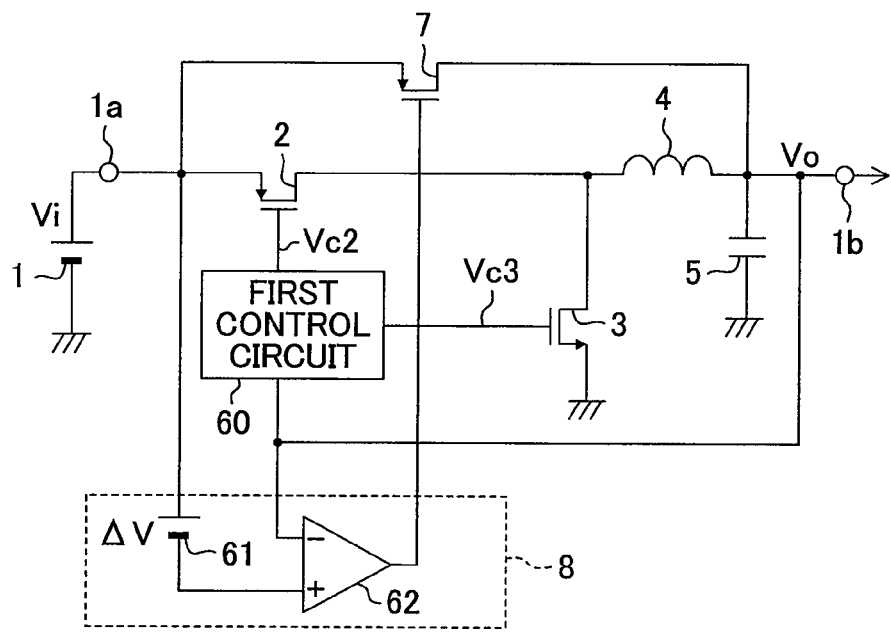
FIG. 4 is a diagram showing a circuit configuration of a step-down switching regulator according to a third embodiment of the present disclosure.

FIG. 4 is a diagram showing a circuit configuration of a step-down switching regulator according to a third embodiment of the present disclosure. In FIG. 4, the same parts as those of the step-down switching regulator of the first embodiment of the present disclosure shown in FIG. 1 are indicated by the same reference symbols and will not be described. The step-down switching regulator of FIG. 4 is different from that of FIG. 1 in that the first and second AND circuits 63 and 64 of FIG. 1 are removed, the switching device 2 is driven by the signal Vc2 output by the first control circuit 60, and the rectifier switching device 3 is driven by the signal Vc3, and also in that a bypass transistor 7 including a P-channel FET which is gate-driven by the output of the comparator 62 is coupled between the input terminal 1a and the output terminal 1b. Here, the offset voltage source 61 and the comparator 62 constitute a second control circuit 8 which drives the bypass transistor 7.

The step-down switching regulator of the third embodiment is different from that of the first embodiment in that, if the input voltage Vi decreases, so that the input-output voltage (Vi−Vo) becomes lower than a predetermined offset voltage ΔV, the bypass transistor 7 is caused to be in the ON state irrespective of the state of the switching device 2. In this case, an ON-resistance R7 of the bypass transistor 7 is sufficiently small, and therefore, the output voltage Vo becomes stable at a value close to the input voltage Vi.

Here, immediately after the input voltage Vi becomes lower than or equal to (Vo+ΔV), the output voltage Vo is higher than a set target voltage. Therefore, the first control circuit 60 causes the signal Vc2 to have a wider pulse width and be at the H level, and therefore, the switching device 2 is caused to be in the OFF state. Therefore, the inductor 4 is no longer energized, and therefore, if the rectifier switching device 3 is switched ON, a current flows from the drain to the source of the rectifier switching device 3, i.e., in a direction opposite to that during normal switching operation. Therefore, the first control circuit 60 has a function of, when the rectifier switching device 3 tries to cause a current to flow in the opposite direction even if the signal Vc2 is at the H level, causing the signal Vc3 to be at the L level to prevent the backflow of the current. In this case, the output voltage Vo is represented by:

$$Vo = Vi - R7 \times Io \quad (9)$$

where Io indicates a current output through the output terminal 1b, and R7 indicates an ON-resistance of the bypass transistor 7.

The offset voltage ΔV is set to be ΔV>R7×Io.

When the input voltage Vi further decreases, so that the output voltage Vo becomes lower than the set target voltage, the first control circuit 60 causes the signal Vc2 to have a minimum pulse width. If the first control circuit 60 can be adjusted up to the duty ratio D=1, the signals Vc2 and Vc3 are caused to be at the L level. In this case, the switching device 2 is also fixed to the ON state, and therefore, if the sum of resistance values of resistors coupled in series between the input and the output, including the ON-resistance of the switching device 2 and the serial resistance of the inductor 4, is indicated by R1, the input-output impedance is a parallel resistance R17 of the sum R1 of the serial resistances between the input and the output, and the ON-resistance R7 of the bypass transistor 7. Here, the parallel resistor R17 is represented by:

$$R17 = R1 \times R7 / (R1 + R7) \quad (10)$$

Therefore, the output voltage Vo is represented by:

$$Vo = Vi - R17 \times Io \quad (11)$$

In this case, hysteresis characteristics are preferably provided so that the first control circuit 60 is prevented from causing the switching device 2 to be in the OFF state again as the output voltage Vo increases.

As described above, according to the step-down switching regulator of the third embodiment of the present disclosure, when the input voltage Vi decreases, so that the input-output voltage (Vi–Vo) becomes lower than a predetermined offset voltage ΔV, then the bypass transistor 7 is forced to be in the ON state. As a result, stable operation is achieved irrespective of the presence or absence of the minimum OFF time period during switching operation and variations in the set target output voltage.

(Fourth Embodiment)

In the third embodiment, the first control circuit 60 requires the function of preventing the backflow of the rectifier switching device 3, and the hysteresis characteristics when the switching device 2 transitions to the operation where the duty ratio D=1. The function of preventing the backflow of the rectifier switching device 3 is generally possessed by synchronous rectifiers. These functions may be removed by newly providing a function of causing the switching device 2 to be in the ON state and at the same time causing the rectifier switching device 3 to be in the OFF state when the bypass transistor 7 is transitioned to the ON state. A step-down switching regulator according to a fourth embodiment of the present disclosure has this new function.

Figure 5:
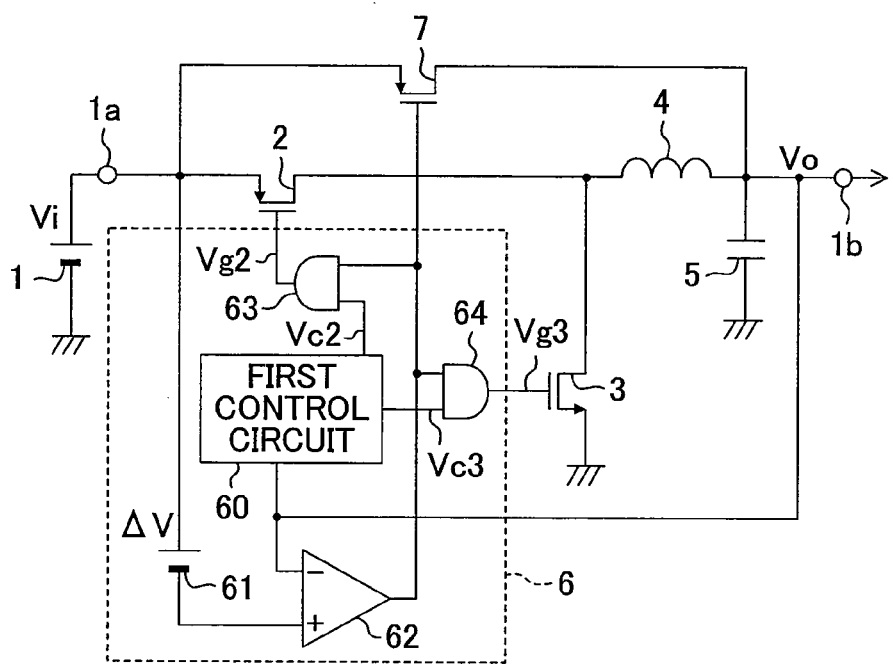
FIG. 5 is a diagram showing a circuit configuration of a step-down switching regulator according to a fourth embodiment of the present disclosure.

FIG. 5 is a diagram showing a circuit configuration of the step-down switching regulator of the fourth embodiment of the present disclosure. In FIG. 5, the same parts as those of the step-down switching regulator of the first embodiment of the present disclosure shown in FIG. 1 are indicated by the same reference symbols and will not be described. The step-down switching regulator of FIG. 5 is different from that of FIG. 1 in that a bypass transistor 7 including a P-channel FET, which is gate-driven by the output of the comparator 62, is coupled between the input terminal 1*a* and the output terminal 1*b*. Except for this point, the operation of the step-down switching regulator of the fourth embodiment of the present disclosure is similar to that of the step-down switching regulator of the first embodiment of the present disclosure shown in FIG. 1, and will not be described in detail.

Note that, in the control circuit 6, the offset voltage source 61, the comparator 62, the first AND circuit 63 and the second AND circuit 64 constitute the second control circuit 8, though not shown.

The operation of the step-down switching regulator of the fourth embodiment is different from that of the step-down switching regulator of the first embodiment in that, when the input voltage Vi decreases, so that the input-output voltage (Vi–Vo) becomes lower than a predetermined offset voltage ΔV, the switching device 2 is forced to be in the ON state and at the same time the bypass transistor 7 is also caused to be in the ON state. As a result, an ON-resistance R7 of the bypass transistor 7 is connected in parallel to the sum R1 of resistance values of resistors coupled in series between the input and the output, including the ON-resistance of the switching device 2 and the serial resistance of the inductor 4. Therefore, the input-output impedance is reduced, whereby the efficiency is improved. Thus, an effect of increasing the capability to supply a current to the output terminal 1*b* is obtained.

Moreover, when the bypass transistor 7 is transitioned to the ON state, the switching device 2 is caused to be in the ON state and at the same time the rectifier switching device 3 is caused to be in the OFF state. Therefore, the first control circuit 60 does not require the function of preventing the backflow of the rectifier switching device 3 and the hysteresis characteristics of the switching device 2 during transition to operation of the duty ratio D=1, which are required in the third embodiment.

(Fifth Embodiment)

Figure 6:
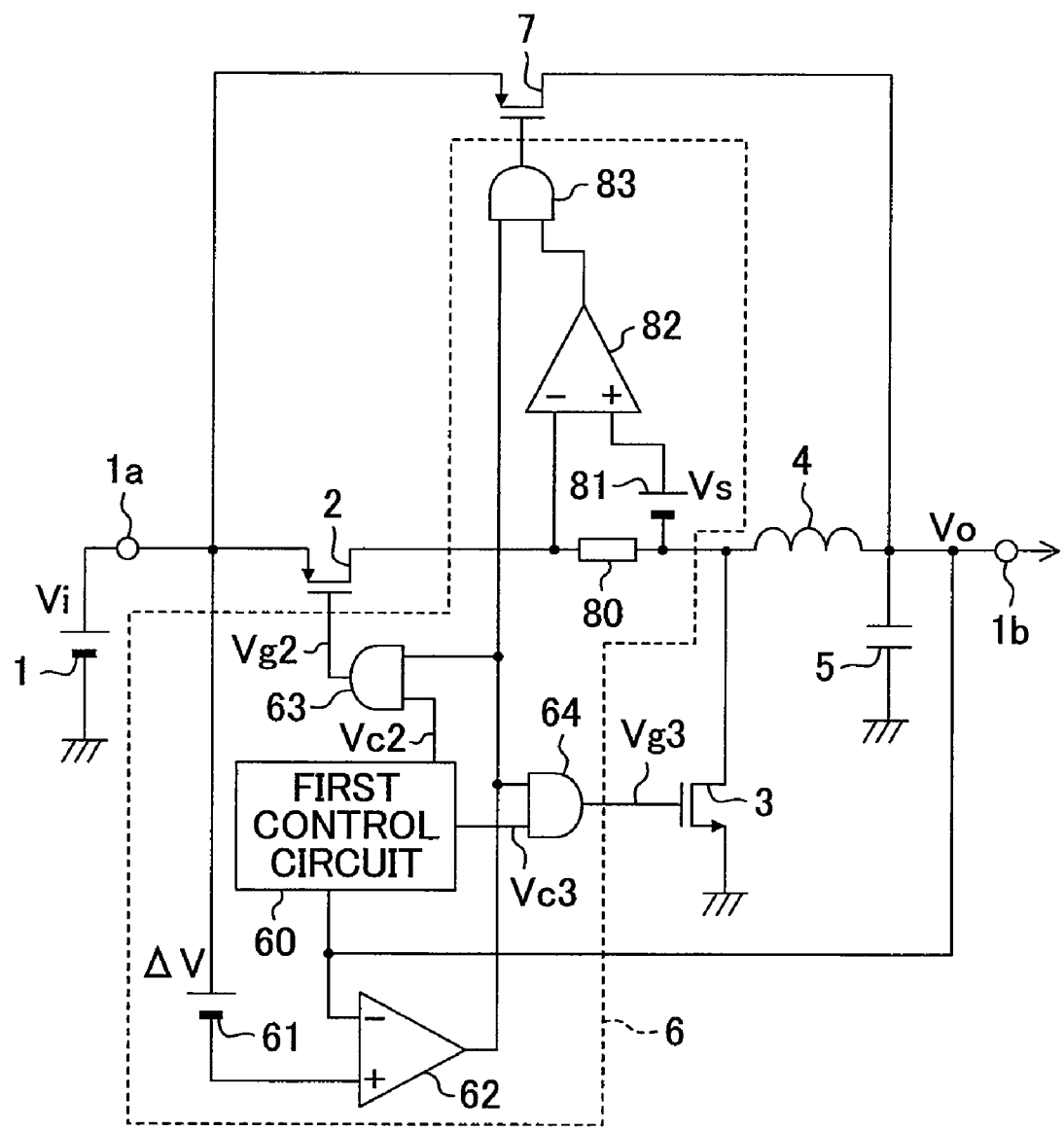
FIG. 6 is a diagram showing a circuit configuration of a step-down switching regulator according to a fifth embodiment of the present disclosure.

FIG. 6 is a diagram showing a circuit configuration of a step-down switching regulator according to a fifth embodiment of the present disclosure. In FIG. 6, the same parts as those of the step-down switching regulator of the fourth embodiment of the present disclosure shown in FIG. 5 are indicated by the same reference symbols and will not be described. The step-down switching regulator of FIG. 6 is different from that of FIG. 5 in that a resistor 80 which detects a current of the switching device 2, a voltage source circuit 81 which generates a voltage Vs, a second comparator 82 which compares a voltage drop of the resistor 80 with the voltage Vs, and a third AND circuit 83 which receives outputs of the first comparator 62 and the second comparator 82 and gate-drives the bypass transistor 7, are additionally provided.

According to the aforementioned configuration, the step-down switching regulator of this embodiment performs similar operation, i.e., when the input voltage Vi decreases, so that the input-output voltage (Vi–Vo) becomes lower than a predetermined offset voltage ΔV, the switching device 2 is forced to be in the ON state and at the same time the bypass transistor 7 is caused to be in the ON state. Moreover, the step-down switching regulator of this embodiment can perform operation even when the output current is so large that the inductor 4 reaches magnetic saturation. Hereinafter, operation which is performed when the output current is large will be described.

In FIG. 6, as the output current increases, a current flowing through the switching device 2 also increases, and therefore, a voltage drop by the resistor 80 also increases. When the voltage drop by the resistor 80 is smaller than the voltage Vs, the output of the second comparator 82 is at the H level, and the bypass transistor 7 is driven by the output of the first comparator 62 via the third AND circuit 83. This state is similar to that in the aforementioned operation of the fourth embodiment. When the output current increases, so that the voltage drop by the resistor 80 exceeds the voltage Vs, the output of the second comparator 82 transitions to the L level, and therefore, the bypass transistor 7 is caused to be in the ON state via the third AND circuit 83. As a result, a current flows from the input terminal 1*a* via the bypass transistor 7 to the output terminal 1*b*.

As described above, according to this embodiment, by causing the bypass transistor 7, which transitions to the ON state to cause a current to flow when the input and output voltages are close to each other, to be in the ON state when the output current is large, the bypass transistor 7 bears a portion of the output current so that the current flowing through the inductor 4 does not exceed a maximum current Imax, whereby the amount of currents borne by the switching device 2 and the inductor 4 can be reduced. In other words, the current supply capability of the bypass transistor 7 is further utilized, thereby making it possible to supply an output current which is larger than or equal to the maximum current Imax of the inductor 4, and therefore, the current supply capability of the step-down switching regulator itself can be enhanced.

Although a current flowing through the switching device 2 is detected in this embodiment, a current flowing through the inductor 4 or the output current itself may be detected. Moreover, the current may be detected by devices other than the resistor 80, e.g., a device which forms a current mirror structure along with the switching device 2.

(Sixth Embodiment)

Figure 7:
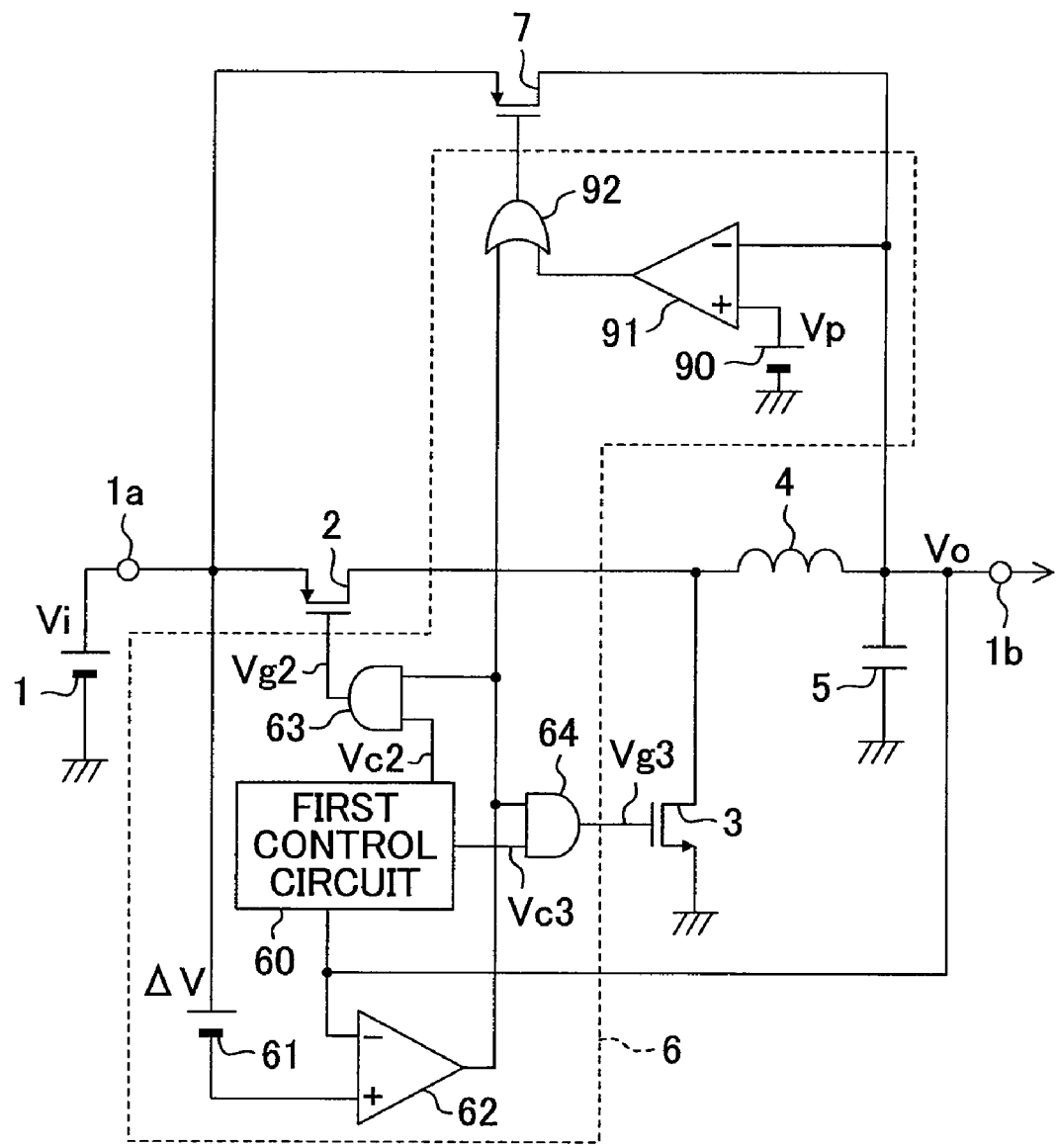
FIG. 7 is a diagram showing a circuit configuration of a step-down switching regulator according to a sixth embodiment of the present disclosure.

FIG. 7 is a diagram showing a circuit configuration of a step-down switching regulator according to a sixth embodiment of the present disclosure. In FIG. 7, the same parts as those of the step-down switching regulator of the fourth embodiment of the present disclosure shown in FIG. 5 are indicated by the same reference symbols and will not be described. The step-down switching regulator of FIG. 7 is different from that of FIG. 5 in that a voltage source circuit 90 which generates a voltage Vp, a third comparator 91 which compares the output voltage Vo with the voltage Vp, and an OR circuit 92 which receives an output of the first comparator 62 and an output of the third comparator 91 and gate-drives the bypass transistor 7, are additionally provided.

In the step-down switching regulator of this embodiment having the aforementioned configuration, when the output voltage Vo decreases to lower than the predetermined voltage Vp, the bypass transistor 7 is forced to be in the OFF state. In this case, even when the input-output voltage (Vi–Vo) becomes lower than a predetermined offset voltage ΔV, so that the first comparator 62 outputs a command to cause the bypass transistor 7 to be in the ON state, the bypass transistor 7 is maintained in the OFF state with priority.

With this configuration, it is possible to additionally provide an effect of protecting the bypass transistor 7 from an overcurrent which is caused by an output ground fault.

(Seventh Embodiment)

Figure 8:
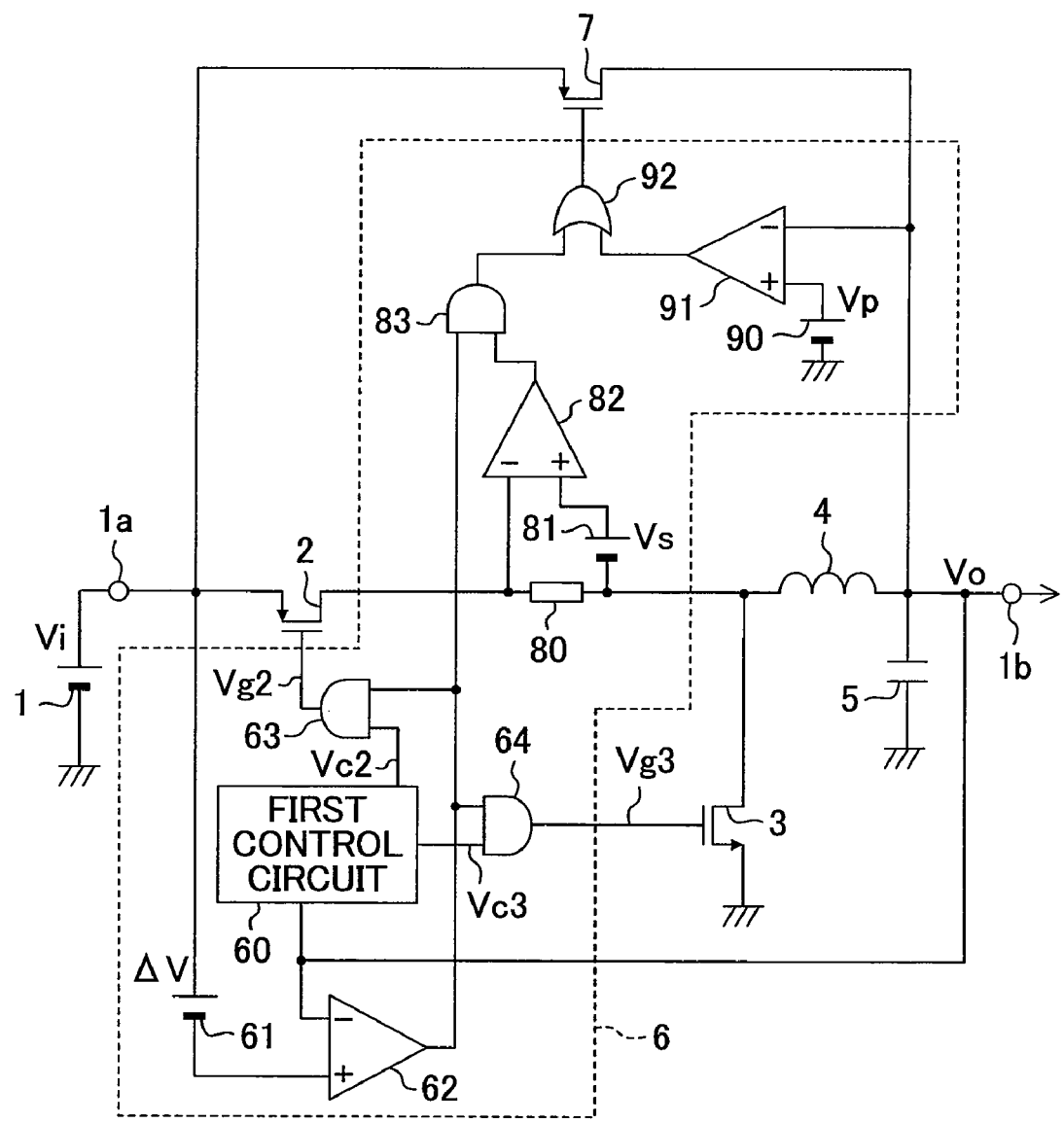
FIG. 8 is a diagram showing a circuit configuration of a step-down switching regulator according to a seventh embodiment of the present disclosure.
Figure 9:
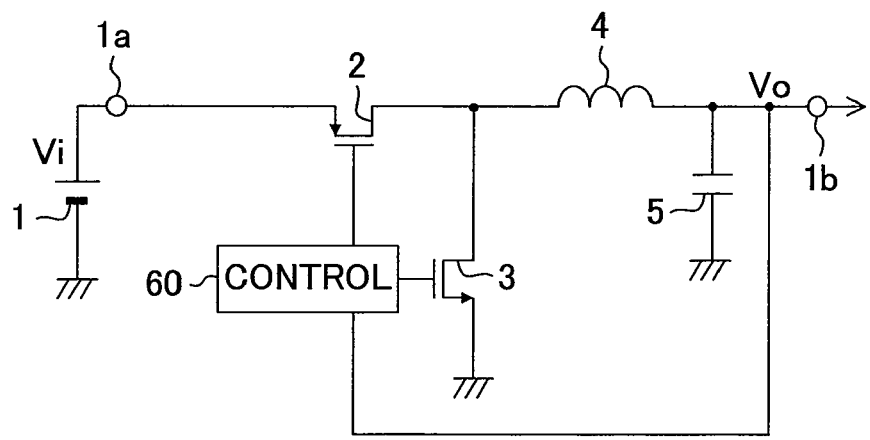
FIG. 9 is a diagram showing a circuit configuration of a conventional typical step-down switching regulator.
Figure 10:
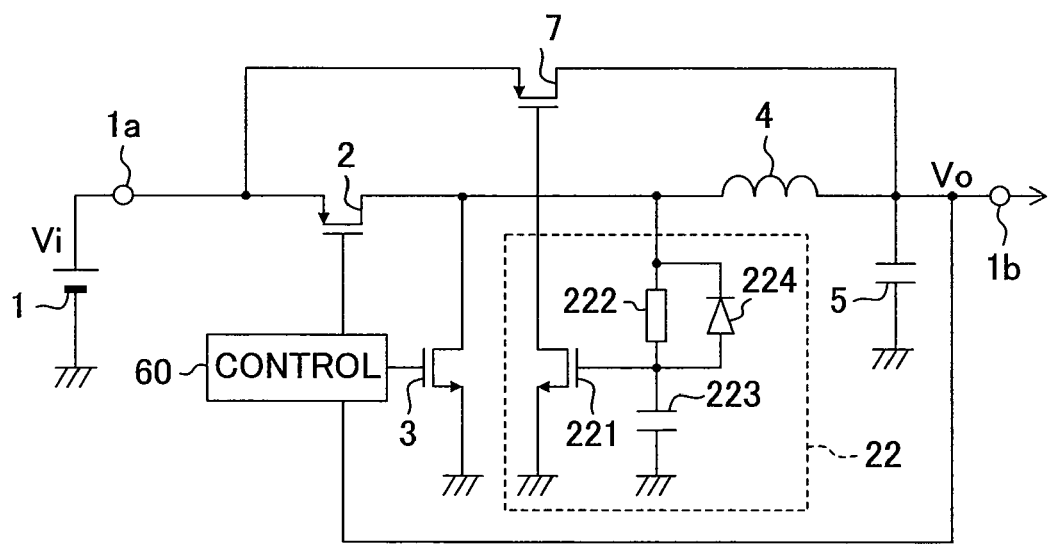
FIG. 10 is a diagram showing a circuit configuration of another conventional step-down switching regulator.

FIG. 8 is a diagram showing a circuit configuration of a step-down switching regulator according to a seventh embodiment of the present disclosure. This is obtained by adding an output ground fault protection circuit for the bypass transistor 7 to the step-down switching regulator of the fifth embodiment of the present disclosure shown in FIG. 6. The protection circuit works effectively even when a current flows through the bypass transistor 7 so as to prevent magnetic saturation of the inductor 4. It is desirable to further provide an overcurrent protection circuit for the switching device 2 in addition to the bypass transistor 7.

Note that the components of the embodiments described above may be combined in any manner which does not depart from the scope and spirit of the present disclosure. For example, although, in the third, fourth, fifth and sixth embodiments, the bypass transistor 7 is turned ON when a difference voltage between the input voltage Vi and the output voltage Vo becomes lower than a predetermined value, a configuration may be selected in which the bypass transistor 7 is turned ON when a difference voltage between the input voltage Vi and the set target output voltage Vor becomes lower than a predetermined value. In this case, an effect similar to that of the second embodiment is obtained.

As described above, the present disclosure is useful for an improvement in performance of a step-down switching regulator, and can be used in, for example, a power source circuit of an electronic apparatus, such as a personal computer, a mobile telephone or the like.

What is claimed is:

1. A step-down switching regulator comprising:
a switching device coupled to an input terminal to which an input voltage is applied;
an inductor having a first end and a second end, the first end being connected to the switching device;
a smoothing unit having an output terminal and configured to smooth a voltage at the second end of the inductor and generate an output voltage which is less than the voltage of the input terminal at the output terminal;
a rectifier configured to flow a current to the inductor when the switching device is in an OFF state; and
a control circuit configured to drive the switching device so that the output voltage becomes equal to a set target voltage,
wherein the control circuit also detects a difference voltage between the input voltage and the output voltage or a difference voltage between the input voltage and the set target voltage, and causes the switching device to be maintained in an ON state when the difference voltage is lower than or equal to a predetermined voltage value.

2. A step-down switching regulator comprising:
a switching device coupled to an input terminal to which an input voltage is applied;
an inductor having a first end and a second end, the first end being connected to the switching device;
a smoothing unit having an output terminal and configured to smooth a voltage at the second end of the inductor and generate an output voltage at the output terminal;
a rectifier configured to flow a current to the inductor when the switching device is in an OFF state; and
a first control circuit configured to drive the switching device so that the output voltage becomes equal to a set target voltage,
a bypass transistor coupled between the input terminal and the output terminal; and
a second control circuit configured to drive the bypass transistor,
wherein the second control circuit detects a difference voltage between the input voltage and the output voltage or a difference voltage between the input voltage and the set target voltage, and causes the bypass transistor to be in an ON state when the difference voltage is lower than or equal to a predetermined voltage value, and
the second control circuit also causes the switching device to be in an ON state when the difference voltage is lower than or equal to a predetermined voltage value.

3. A step-down switching regulator comprising:
a switching device coupled to an input terminal to which an input voltage is applied;
an inductor having a first end and a second end, the first end being connected to the switching device;
a smoothing unit having an output terminal and configured to smooth a voltage at the second end of the inductor and generate an output voltage at the output terminal;
a rectifier configured to flow a current to the inductor when the switching device is in an OFF state; and
a first control circuit configured to drive the switching device so that the output voltage becomes equal to a set target voltage,
a bypass transistor coupled between the input terminal and the output terminal; and
a second control circuit configured to drive the bypass transistor,
wherein the second control circuit detects a difference voltage between the input voltage and the output voltage or a difference voltage between the input voltage and the set target voltage, and causes the bypass transistor to be in an ON state when the difference voltage is lower than or equal to a predetermined voltage value,
the rectifier is a synchronous rectifier including a rectifier switching device, and
the second control circuit also causes the rectifier switching device to be in an OFF state when the difference voltage is lower than or equal to a predetermined voltage.

4. A step-down switching regulator comprising:
a switching device coupled to an input terminal to which an input voltage is applied;
an inductor having a first end and a second end, the first end being connected to the switching device;
a smoothing unit having an output terminal and configured to smooth a voltage at the second end of the inductor and generate an output voltage at the output terminal;
a rectifier configured to flow a current to the inductor when the switching device is in an OFF state; and a first control circuit configured to drive the switching device so that the output voltage becomes equal to a set target voltage, a bypass transistor coupled between the input terminal and the output terminal; and a second control circuit configured to drive the bypass transistor, wherein the second control circuit detects a difference voltage between the input voltage and the output voltage or a difference voltage between the input voltage and the set target voltage, and causes the bypass transistor to be in an ON state when the difference voltage is lower than or equal to a predetermined voltage value, and the second control circuit also detects the current flowing through the inductor, and drives the bypass transistor so that the current flowing through the inductor does not exceed a predetermined current value.

* * * * *